(No Model.)
W. H. H. SISUM.
EQUALIZER FOR CABLES OF CABLE RAILWAYS.
No. 361,378. Patented Apr. 19, 1887.
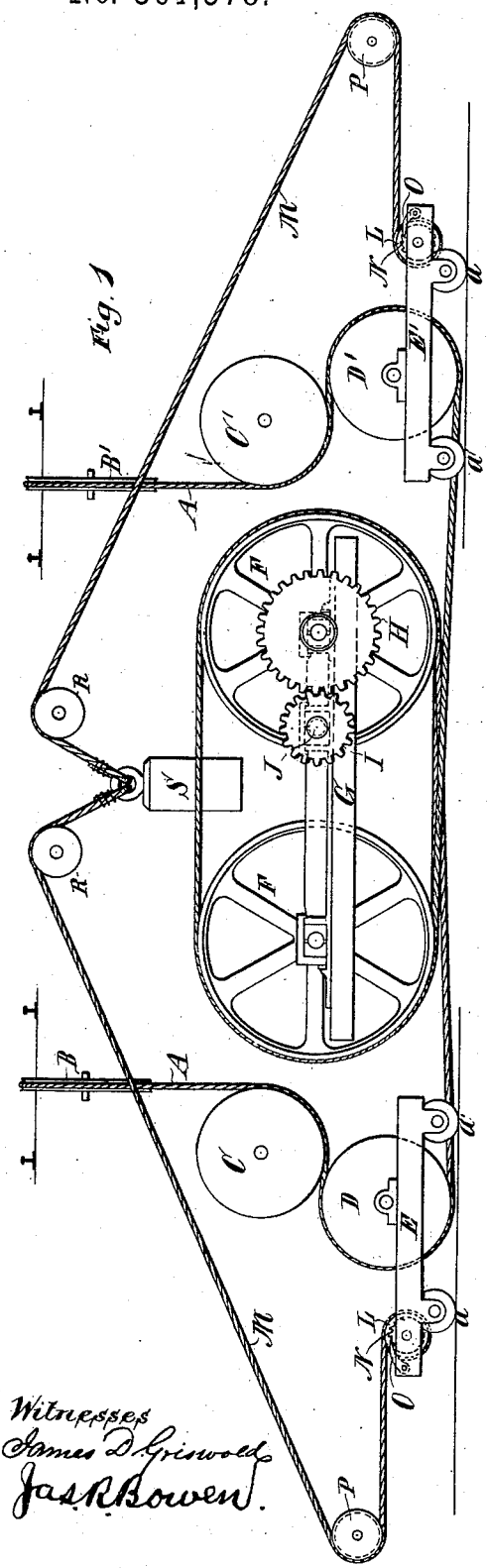
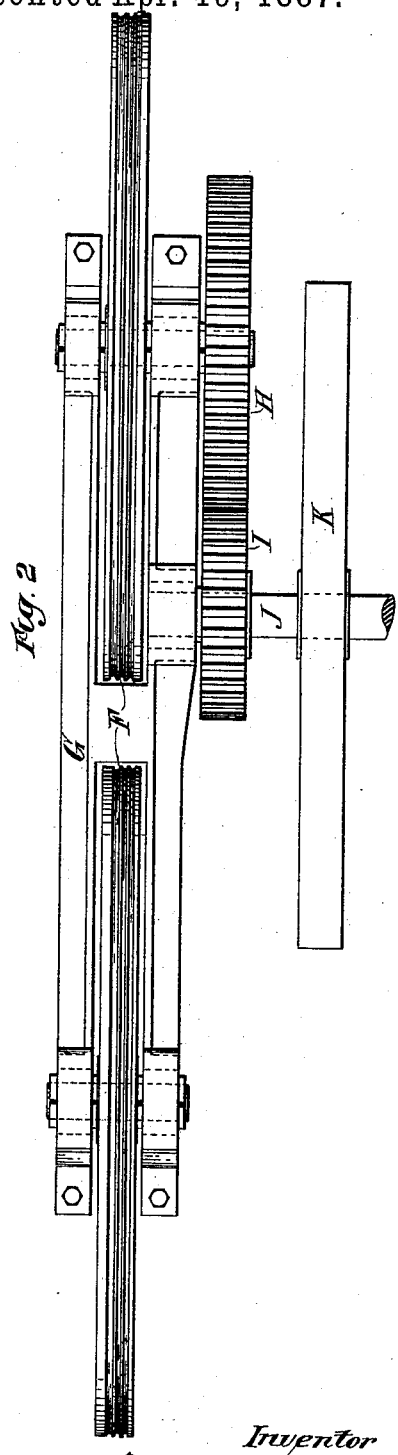

UNITED STATES PATENT OFFICE.

WILLIAM H. H. SISUM, OF BROOKLYN, NEW YORK.

EQUALIZER FOR CABLES OF CABLE RAILWAYS.

SPECIFICATION forming part of Letters Patent No. 361,378, dated April 19, 1887.

Application filed June 18, 1886. Serial No. 205,563. (No model.)

*To all whom it may concern:*

Be it known that I, WILLIAM H. H. SISUM, of Brooklyn, in the county of Kings and State of New York, have invented a certain new and useful Improvement in Equalizers for Cables of Cable-Railways, of which the following is a specification.

My improvement relates to equalizers employed to equalize the strain upon cables and prevent jerking upon the gearing and engines used in cable railways. It frequently occurs in such railways that greater strain is brought to bear upon that portion of the cable running in one direction than upon that running in the other, owing to the descent of cars or trains down grades or for other cause, whereby a slacking of the cable will occur in front of the car or train, which disturbs the equilibrium of strain.
It is the object of my improvement to take up this slack and equalize the strain.

I will describe my improved equalizer in detail, and then point out the novel features in a claim.
In the accompanying drawings, Figure 1 is a side elevation of an equalizer embodying my improvement. Fig. 2 is a plan or top view of a portion of the same.

Similar letters of reference designate corresponding parts in both figures.

A designates a cable, which, as is usual in cable railways, is made of wire and is endless. Near the top of Fig. 1 the cable is shown as extending over a pulley, B, from between the rails of a railway. After leaving the pulleys B the cable passes around a pulley, C, arranged at approximate right angles to the pulley B. The pulley C may be journaled in suitable bearings. (Not shown in the drawings.) Passing from the pulley C the cable passes around another pulley, D, arranged with its axis approximately parallel with the axis of the pulley C, and mounted in a carriage, E. After leaving the pulley D the cable makes one or more turns around grooved wheels or drums F, mounted in bearings in a frame, G, which frame may be supported upon a floor or other suitable support. After leaving the drums F it passes around a pulley, D', mounted in a carriage, E', similar to the carriage E, and thence over pulleys C' B', similar to the pulleys C B.

Motion is transmitted to one of the wheels F by means of a gear-wheel, H, mounted on the shaft of the wheel and meshing with another gear-wheel, I, keyed upon an engine-shaft, J. By this means the cable is kept traveling. K designates a fly-wheel on the engine-shaft.

The carriages E E' are of frame-like construction and are supported upon wheels *a a'*. The wheels *a a'* may rest upon a floor or other suitable support. Journaled in the rear ends of the carriages are drums L, to which are secured and about which may be wound ropes or chains M. The ropes or chains may be wound upon the drums, and the drums may then be secured from turning, so as to unwind the ropes or chains by ratchet-wheels N, secured to the drums, and pawls O on the carriages engaging the ratchet-wheels. After leaving the drums L the ropes or chains pass backwardly and around pulleys P, journaled in suitable bearings. (Not shown in the drawings.) Leaving the pulleys P, the ropes or chains pass upwardly toward each other and over pulleys R, suitably mounted in bearings. (Not shown.) From the pulleys R the ropes or chains pass downwardly to a weight, S, suspended therefrom, and to which they are independently connected.

When slack occurs in the cable upon either side, the carriages E E' upon the side where the slack occurs will be moved backwardly by the weight S exerting force through the rope or chain M, with which the carriage is connected, thus taking up over the adjacent pulleys C or C' and D or D' the slack in the cable. As the carriage moves backwardly the force of the weight S on the rope or chain with which the carriage is connected is necessarily lessened and thrown with increased force upon the other rope or chain M, whereby the other carriage is drawn backwardly, so as to tighten the cable until the equilibrium of strain is restored, when both carriages return to their normal position and the weight S is again caused to exert equal force upon both the ropes or chains M. It is to be observed that the weight S is so suspended from the ropes M that when its force is lessened upon one of the ropes or chains it will be caused to swing laterally as well as move downwardly.

Of course, if, instead of slack occurring in the cable, it is suddenly stretched or tightened from any cause, the effect would be to draw the carriages forward and raise the weight S in manner conversely to that just described, thereby giving more play to the cable and thus equalizing strain.

By my improvement it will be seen that all jerking or sudden strain upon the gear-wheels H and I and upon the engine driving the cables is avoided, as the cable passes around the wheels F under a uniform strain.

What I claim as my invention, and desire to secure by Letters Patent, is—

In an equalizer for cable railways, the combination, with pulleys over which the cable passes, of carriages in which certain of said pulleys are mounted, wheels, as F, around which the cable passes, ropes or chains connected to the carriages, pulleys around which said ropes or chains pass, and a weight to which both said ropes or chains are connected, substantially as and for the purpose specified.

WM. H. H. SISUM.

Witnesses:
JAMES D. GRISWOLD,
JOS. R. BOWEN.